United States Patent [19]
Cathell et al.

[11] Patent Number: 5,121,314
[45] Date of Patent: Jun. 9, 1992

[54] BI-MODE HIGH VOLTAGE RESONANT POWER SUPPLY AND METHOD

[75] Inventors: Franklin J. Cathell, Descanso; Bryan E. Strickland, San Diego, both of Calif.

[73] Assignee: Maxwell Laboratories, San Diego, Calif.

[21] Appl. No.: 650,036

[22] Filed: Feb. 4, 1991

[51] Int. Cl.[5] .................... H02M 3/315; H02M 3/337
[52] U.S. Cl. ........................................ 363/17; 363/78; 363/98
[58] Field of Search ................. 363/17, 28, 56, 58, 363/79, 98; 323/235

[56] References Cited

U.S. PATENT DOCUMENTS

| | | | |
|---|---|---|---|
| 3,596,165 | 7/1971 | Andrews . | |
| 4,030,015 | 6/1977 | Herko et al. . | |
| 4,301,398 | 11/1981 | Johnson | 320/21 |
| 4,528,494 | 7/1985 | Bloomer | 323/235 |
| 4,541,041 | 9/1985 | Park et al. | 363/17 |
| 4,614,999 | 9/1986 | Onodera et al. | 363/28 |
| 4,672,528 | 6/1987 | Park et al. | 363/98 |
| 4,691,273 | 9/1987 | Kuwata et al. | 363/17 |
| 4,692,851 | 9/1987 | Attwood | 363/16 |
| 4,811,188 | 3/1989 | Bees | 320/1 |
| 4,855,888 | 8/1989 | Henze et al. | 363/17 |

FOREIGN PATENT DOCUMENTS 2060220  4/1981  United Kingdom ................. 363/17

OTHER PUBLICATIONS

Tsai, et al.; "Constant-Frequency, Clamped-Mode Resonant Converters", *IEEE PESC Record*, 557-566 (1987).
SG1525A/1527A; "Regulating Pulse Width Modulator" in *Silicon General Linear Integrated Circuits*, (Apr. 1990).
SG1524B; "Regulating Pulse Width Modulator" in *Silicon General Linear Integrated Cicuits*, (Apr. 1990).

*Primary Examiner*—William H. Beha, Jr.
*Attorney, Agent, or Firm*—Fitch, Even, Tabin & Flannery

[57] ABSTRACT

A capacitor-charging series resonant mode, high voltage power supply (SRMPS) (10) includes a switching network (30) that alternately applies a positive and negative voltage to a series resonant circuit, comprising a resonant capacitor and inductor. The inductor may include the primary winding (14) of a power transformer (12). The switching action occurs at a fixed frequency above the audible range. This frequency is approximately the resonant frequency of the series resonant circuit. The switching action causes sine wave quantums of current of alternating phase to flow through the primary winding. Secondary windings (16) of the transformer are coupled through a suitable rectifying network (18) to charge a load capacitor $C_L$ to a high voltage. During a first mode of operation the load capacitor is charged at a maximum rate. During a second mode, the load capacitor is charged only as needed to maintain a desired charge thereon. Switching between the two modes occurs automatically depending upon the capacitive load requirements. The first mode operates with a control loop open, and is used when initially charging the load capacitor. The second mode operates with the control loop closed, at a low duty cycle, and allows only a small sliver of the front end of the sine wave current quantum to flow through the primary winding.

17 Claims, 6 Drawing Sheets

BI-MODE HIGH VOLTAGE RESONANT POWER SUPPLY AND METHOD

BACKGROUND OF THE INVENTION

The present invention relates a high voltage series resonant mode power supply (SRMPS) used for charging capacitors. More particularly, the invention relates to apparatus and methods for automatically controlling a capacitor-charging SRMPS in one of two operating modes in order to efficiently provide a highly regulated output voltage over a wide range of capacitive output loads, once a charge voltage is reached, and yet always operate at a fixed frequency above the audible range.

An SRMPS is a particular type of power supply that switches an alternating input voltage across a series resonant circuit so as to excite a series resonant current. The series resonant current is delivered to a primary winding of a power transformer. One or more secondary windings of the power transformer are coupled to respective full-wave rectifier circuits. The full-wave rectifier circuits, in turn, are connected in series so as to apply a single rectified voltage across the capacitive output load. The resonant current delivered to the primary winding of the transformer thus couples power to and charges the load capacitor with a pulsating dc current that has a constant RMS value over time.

Advantageously, the output impedance of an SRMPS is high and the output appears as a constant current source. These characteristics allow the power supply to be short-circuit immune, and further allow the power converter stage to be highly buffered from the output load conditions. Such a power supply is thus ideal for driving capacitive loads, which loads may momentarily appear as a short circuit.

As indicated, an SRMPS contains a resonant circuit. This resonant circuit is placed in series with the primary winding of the power transformer used within the SRMPS. The load capacitor is coupled via rectifier circuits to the secondary windings of the power transformer. The resonant circuit produces primary current in the form of sine waves. The energy delivered to the load capacitor, once a full charge is reached, is normally controlled by varying the frequency of the sine wave delivery period to a frequency that keeps the voltage on the capacitor constant, taking care to ensure that any switching of the primary current occurs only when the sine wave current is at zero. Thus, for load capacitors with low leakage currents, a sine wave "quantum" or "packet" (comprising a single sine wave of electrical current) is delivered to the transformer primary followed by a variable dead time before the next sine wave "quantum" is delivered (low duty cycle). As the load capacitor leakage currents increase, as typically occurs with larger capacitors, the dead time between sine wave quantums decreases, so that more and more sine wave quantums are delivered to the high voltage capacitor per unit of time (moderate duty cycle) to maintain the fully charged voltage regulation. During a charging mode, i.e., while charging the capacitor up to a full charge, the dead time is decreased to near zero, causing essentially a continuous, full-wave rectified sine wave current train to be delivered to the load capacitor (100% duty cycle).

Unfortunately, once the capacitor is charged, the rate at which the sine wave quantums or packets are delivered to the output capacitor for low leakage current is usually in the audible range. This causes a noticeable "whine" in the transformer which is not desirable. Further, because of the fixed resonant frequency of the circuit, and the corresponding fixed amount of energy for each sine wave packet, the ripple on the output capacitor may be excessive, particularly for low capacity values where the SRMPS is operating with only an occasional quantum of energy being delivered to maintain a desired charge on the capacitor.

Hence, what is needed is a way of operating an SRMPS at a fixed frequency well above the audible range regardless of the output power requirements of the power supply once the load capacitor is charged, thereby eliminating any "whine" or other similar noise associated with the transfer of energy quantums through a transformer. However, coupled with such need for high frequency (non-audible) operation is the additional need to maintain the precise charge level on the load capacitor of the SRMPS, regardless of the capacitor leakage current, thereby avoiding excessive ripple on the load capacitor.

The present invention advantageously addresses the above and other needs.

SUMMARY OF THE INVENTION

In accordance with one aspect of the present invention, a high voltage series resonant mode power supply (SRMPS) is provided that efficiently maintains a regulated high output voltage across an output load capacitor. The SRMPS includes a switching or inverting network that alternately applies a positive and negative voltage to a series resonant tank circuit. The series resonant tank circuit comprises a capacitor and an associated inductor. The inductor may include the leakage reactance of the primary winding of a power transformer. The switching action advantageously occurs at a fixed frequency above the audible range. Further, the switching period is approximately twice the resonant period frequency of the series resonant tank circuit. The switching action causes sine wave quantums of current of alternating phase to flow through the primary winding, with the switching of the current (changing phase) occurring when the current is at or near zero. Secondary windings of the transformer are coupled through respective rectifying circuits to the load capacitor. The load capacitor is charged to a desired charge level (voltage) and this charge level is maintained by a suitable regulation circuit.

In accordance with another aspect of the invention, the SRMPS includes a control circuit for automatically operating the SRMPS in one of two modes. During a first mode of operation, termed the "full charge mode", the load capacitor is charged at a maximum rate. During a second mode, termed the "keep alive mode", the load capacitor is charged only as needed to maintain a specified constant voltage thereon. Switching between the two modes occurs automatically depending upon the load capacitor requirements of the SRMPS. The full charge mode operates at a 100% duty cycle with a control loop of the SRMPS open, and is used when initially charging the load capacitor. The keep-alive mode operates at a low duty cycle with the control loop closed, and allows only a small "sliver" of the front end of the sine wave current quantum to flow. The width of the sine wave current "sliver" is adjusted as required, up to a maximum conduction angle, e.g., of 45°, in order to keep a specified constant voltage on the load capacitor. Advantageously, an SRMPS controlled in this manner operates efficiently at a fixed frequency in the non-audible range.

One embodiment of the present invention may thus be characterized as a bi-mode power supply. Such bi-mode power supply includes a series resonant mode capacitor-charging power supply that provides an output voltage across a load capacitor. The power supply also includes control means for controlling the series resonant mode power supply so that it automatically operates in one of two modes. A first mode is operative whenever the output voltage is less than a prescribed threshold level. A second mode is operative whenever the output voltage is equal to or greater than the prescribed threshold level. Sensing means sense the output voltage and couple it to the series resonant mode power supply and the control means. The first mode comprises a resonant mode wherein the series resonant mode power supply operates at a fixed resonant frequency at substantially a 100% duty cycle. The second mode comprises a keep-alive mode wherein the series resonant mode power supply operates at a low duty cycle in a non-resonant, pulse-width modulated mode.

A second embodiment of the invention may be characterized as a bi-mode high voltage resonant power supply that includes: (1) a power transformer having a primary winding and a plurality of secondary windings; (2) rectifier means coupled to each of the secondary windings for rectifying and combining the voltages present at each secondary winding, and presenting the combined voltage to be capacitive load; (3) a resonant circuit connected with the primary winding of the power transformer; (4) an invertor circuit that alternately switches positive and negative voltages across the resonant circuit so as to cause a resonant sinusoidal current to momentarily flow through the primary winding of the power transformer, the resonant sinusoidal current having a phase associated therewith commensurate with the polarity of the switched voltage; and (5) a control circuit that generates switching signals at a fixed switching frequency that is greater than approximately 20,000 Hz, the fixed switching frequency being related to the resonant frequency of the resonant sinusoidal current, the switching signals being coupled to the invertor circuit to control the switched voltage; and (6) input power supply means for providing the voltages that are switched across the resonant circuit.

The control circuit for this second embodiment of the invention includes: (a) sensing means for sensing an output voltage across the capacitive load of the bi-mode resonant power supply, (b) comparison means for determining when the sensed output voltage exceeds a preselected reference voltage, and (c) modulator means for generating the switching signals. The modulator means operates in an open loop mode whenever the sensed output voltage is less than the preselected reference voltage, and in a closed loop mode whenever the sensed output voltage is equal to or greater than the first preselected voltage.

In operation, the switching signals are generated in the open loop mode so as to allow substantially a complete cycle of the resonant sinusoidal current to flow through the primary winding before switching the polarity of the applied voltage. Current thus flows through the primary winding at substantially a 100% duty cycle relative to the period of the fixed switching frequency. In contrast, the switching signals are generated in the closed loop mode so as to allow only a small initial portion of each cycle of the resonant sinusoidal current to flow through the primary winding before clamping such current off for the remainder of the switching cycle. Current thus flows through the primary winding at a low duty cycle relative to the period of the fixed switching frequency.

Yet another embodiment of the invention may be characterized as control apparatus for use with a series resonant mode power supply. Such control apparatus includes: (1) sensing means for sensing an output voltage generated by the series resonant mode power supply; and (2) control means for operating the series resonant mode power supply in a resonant mode whenever the output voltage is less than a prescribed threshold level, and for operating the series resonant mode power supply in a keep-alive, non-resonant, pulse-width modulated mode whenever the output voltage is equal to or grater than the prescribed threshold level.

Further, it is noted that the present invention includes a method of controlling a resonant mode power supply used to charge and maintain a prescribed voltage on a load capacitor. Such resonant mode power supply includes a power transformer that has a primary winding that forms part of a resonant circuit. Further, the power transformer has at least one secondary winding coupled to a full-wave rectifier circuit. When a voltage is induced in the secondary wining(s) by an appropriate current flow in the primary winding, a charge is developed on the load capacitor in conventional manner. The method includes the steps of: (a) sequentially applying a DC input voltage of alternating polarities at a fixed switching rate across the resonant circuit so as to cause a resonant sinusoidal current of alternating phase to flow through the primary winding, with the resonant sinusoidal current changing phase only at those times within its cycle when the amplitude of the current is approximately zero; (b) when the voltage on the load capacitor is less than a prescribed level, applying the DC input voltage of alternating polarities across the resonant circuit at substantially a 100% duty cycle relative to the fixed switching rate, whereby the load an input voltage of one polarity is applied across the resonant circuit for a sufficient time to allow substantially a complete sinusoidal cycle of the resonant sinusoidal current to flow through the primary winding before applying an input voltage of the opposite polarity across the resonant circuit, whereby the load capacitor is charged at a maximum rate; and (c) when the voltage is on the load capacitor is at a prescribed level, applying the DC input voltage of alternating polarities across said resonant circuit at a duty cycle no greater than about 13%, whereby an input voltage of one polarity is applied across the resonant circuit for a short time period, and allows only a small portion of the resonant sinusoidal current to flow through the primary winding during each period of the switching rate, whereby the charge is precisely maintained on the load capacitor.

It is a feature of the present invention to provide an SRMPS for use with a capacitive load that operates at a fixed frequency above the audible range, and that maintains a highly regulated voltage at the capacitive load, once the capacitive load has been charged.

It is a further feature of the present invention to provide an SRMPS that efficiently converts nominally available input power, e.g., three-phase 208 VAC, to a high DC output voltage, e.g., 25 kV at 160 ma constant current charge rate (4000 watts).

It is also a feature of the present invention to provide an SRMPS control circuit that operates the SRMPS at a fixed frequency above the audible range.

It is another feature of the invention to provide such an SRMPS control circuit that controls the SRMPS such that it provides a regulated output voltage with low ripple to a capacitive load over a wide range of load capacitors.

It is still an additional feature of the invention to provide bi-mode SRMPS power supply that operates in one of two modes, a first "full charge" 100% duty-cycle mode for initially charging a load capacitor, and a second "keep alive" mode for delivering low charge levels to the load capacitor. During the keep alive mode, it is a feature of the invention that the sinusoidal current used to maintain a charge on the output capacitor be switched off and on so as to provide a duty cycle that is less than or equal to about 20%, preferably less than or equal to 13%.

It is yet another feature of the invention to provide an efficient method of operating an SRMPS at a fixed frequency above the audible range.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
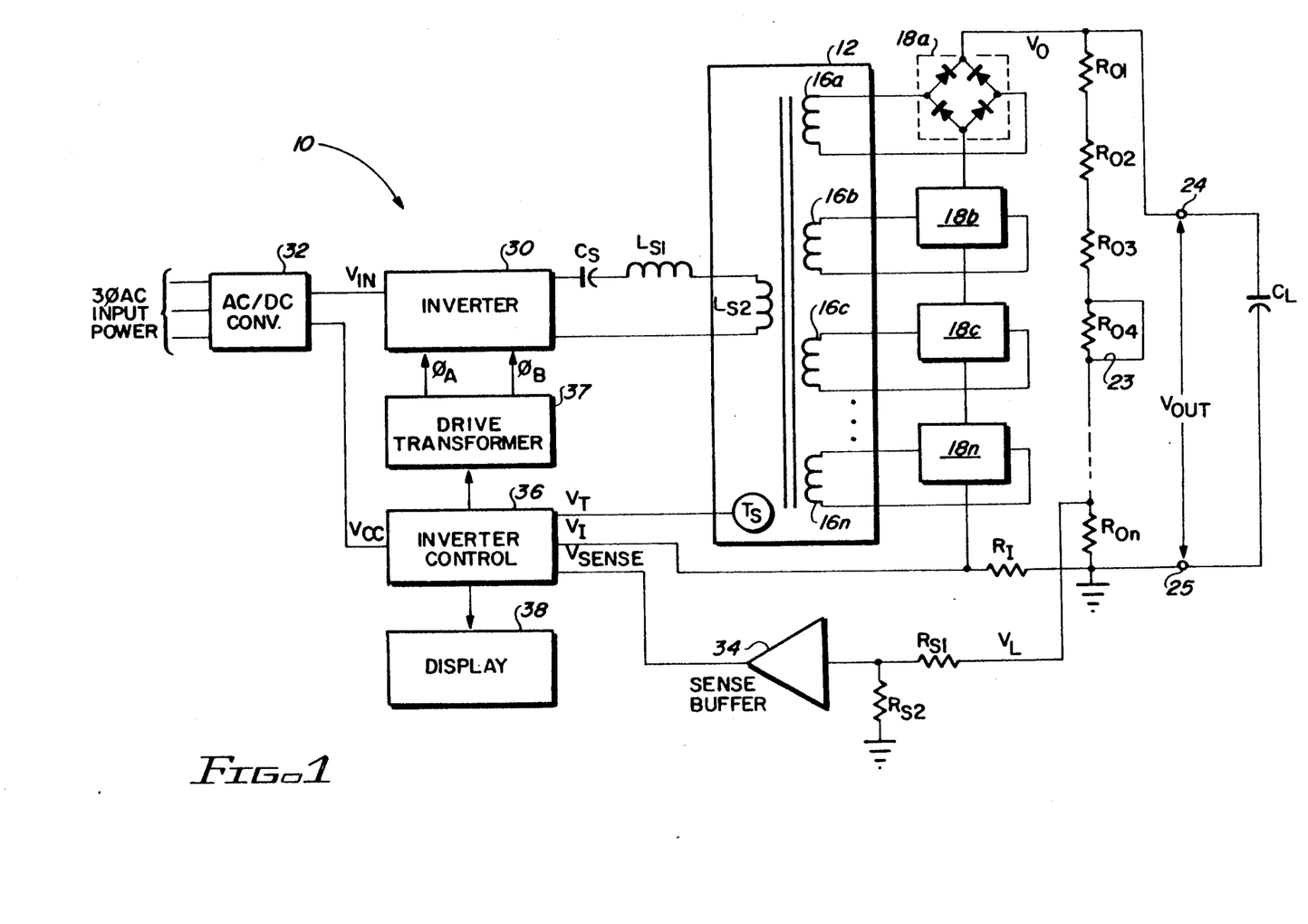
FIG. 1 is a block diagram of a series resonant mode power supply (SRMPS)

Referring first to FIG. 1, there is shown a block diagram of a high voltage series resonant mode power supply (SRMPS) 10 made in accordance with the present invention. The SRMPS 10 includes a power transformer 12 having a primary winding 14, and a plurality of secondary windings 16a, 16b, 16c, . . . 16n. The primary winding 14 forms part of a series resonant circuit that includes a series capacitor $C_S$, and an inductor $L_S$. The inductor $L_S$ may include a first series inductor $L_{S1}$ as well as the inductance of the primary winding, $L_{S2}$.

The series resonant circuit that includes the primary winding 14 of the transformer 12 is connected to an invertor circuit 30. As explained more fully below, it is the function of the invertor circuit 30 to sequentially apply or "switch" a dc voltage of alternating polarity across the invertor circuit so as to trigger a resonant sinusoidal current therein. Such resonant sinusoidal current has an alternating phase (0° and 180°) commensurate with the polarity of the applied voltage. This sinusoidal current thus induces a voltage at the secondary windings 16 of the transformer 12 in conventional manner. The dc voltage that is "switched" across the series resonant circuit by the invertor circuit 30 is obtained from any suitable power input source. For the embodiment shown in FIG. 1, an input voltage $V_{IN}$ is obtained from an AC-to-DC Converter 32. The AC/DC converter 32, in turn, obtains its input power from an available AC power source, e.g., a conventional 208 VAC three-phase power line.

Full-bridge rectifier circuits 18a, 18b, 18c, . . . 18n are connected respectively to each of the secondary windings 16a, 16b, 16c, . . . 16n of the transformer 12. The rectifier circuits 18a, 18b, 18c, . . . 18n are "stacked" or connected together so that the rectified output voltage of one is added to the rectified output voltages of the others. The net result is a high rectified output voltage, $V_0$.

A series network of output resistors $R_{01}$, $R_{02}$, $R_{03}$, . . . $R_{0n}$ is provided for dividing the output voltage down to an acceptable sensing level. One or more of these resistors, e.g., $R_{04}$, may also have a jumper 23 thereacross to allow such resistor(s) to be selectively included or excluded from the resistive network. Output terminals 24 and 25 of the power supply are connected to a load capacitor $C_L$. As needed or desired for a particular application, the transformer 12, including the series resonant circuit, the rectifier circuits 18a, 18b, 18c, . . . 18n, the output capacitor network $C_0$, and the output resistive network may all be sealed in a suitable transformer oil enclosure for maximum voltage insulation.

The output voltage, $V_{OUT}$, available at the output terminals 24 and 25 is delivered to the capacitive load, represented in FIG. 1 as the capacitor $C_L$. The voltage across the load capacitor, after being reduced to the desired sense level by the resistive network $R_{01}$ through $R_{0n}$, is monitored through a sense buffer amplifier 34.

As seen in FIG. 1, a resistive dividing network, comprising resistors $R_{s1}$ and $R_{s2}$ connected in series, may be used to further reduce the sensed output voltage $V_{OUT}$ to a manageable level before applying such voltage to the sense buffer amplifier 34. For example, a typical high voltage series resonant power supply may produce an output voltage $V_{OUT}$ on the order to +25,000 volts. A resistive dividing network may thus be used to reduce the input voltage to the sense buffer amplifier to a more manageable value of around 10 volts.

The output of the sense buffer amplifier, $V_{SENSE}$, is coupled to an invertor control circuit 36. It is the function of the invertor control circuit 36, as explained more fully below, to generate the switching signals used by the invertor 30 to switch the polarity of the input voltage $V_{IN}$ across the series resonant circuit. These switching signals are identified in FIG. 1 as $\phi_A$ and $\phi_B$, and are sometimes referred to as the "gate" signals or "phase-control" signals. The invertor control circuit 36 obtains an operating voltage, $V_{CC}$, and any other voltages needed for its operation (such as reference voltages), from the AC/DC converter 32.

The gate signals $\phi_A$ and $\phi_B$ are coupled to the invertor circuit 30 via a drive transformer 37. The drive transformer 37 converts the gate signals $\phi_A$ and $\phi_B$ to a desired number and magnitude. For example, whereas the invertor control signal may generate a pair of gate signals $\phi_A$ and $\phi_B$, at standard logic levels, the drive transformer 37 may convert this pair of drive signals to a plurality of pairs of gate signals having a higher amplitude than provided at the output of the invertor control circuit 36.

Also coupled to the invertor control circuit 36 are other signals representative of various other parameters that may be sensed during operation of the power supply 10. A voltage $V_I$, measured across a current-sensing resistor $R_I$ in series with the output of the power supply, may be obtained to represent a voltage proportional to the output current of the power supply. A voltage or other signal $V_T$, which signal may be obtained from a temperature sensor $T_S$, may be obtained to represent the temperature of the power transformer 12 or other location whereat the sensor $T_S$ is located. As needed or desired, any of these sensed parameters, including the load voltage $V_{OUT}$, may be displayed on a suitable display 38 that is coupled to the invertor control circuit 36.

Figure 2A:
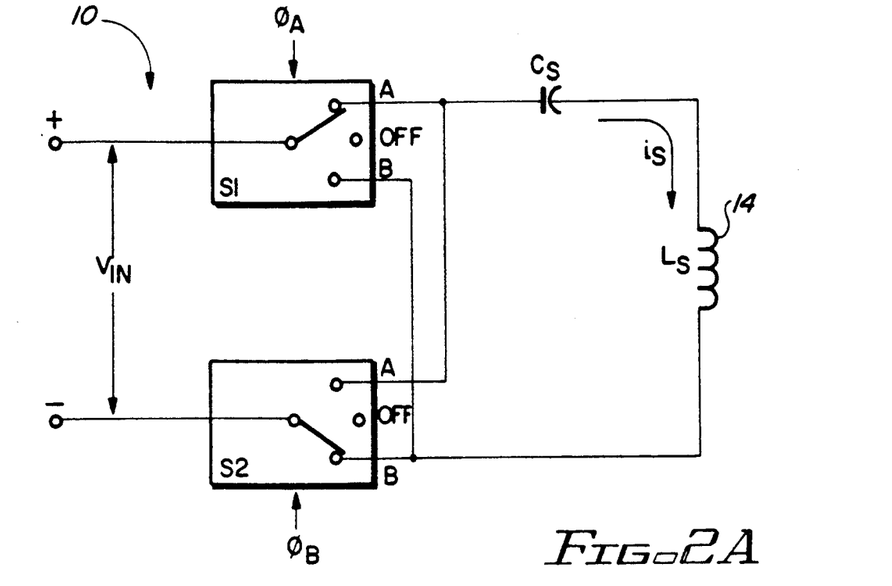
FIG. 2A is a functional block diagram of the invertor portion of the SRMPS of FIG. 1, and includes the primary winding of the power transformer.

FIG. 2A shows a functional block diagram of the invertor 30 of the SRMPS 10 of FIG. 1. As seen in FIG. 2A, the series resonant circuit is made up of capacitor $C_S$ and inductor $L_S$. ($L_S$, as indicated above, may include the reactance of the primary winding 14 of the power transformer 12). The invertor circuit 30 functionally includes two switches, S1 and S2. Switch S1 is connected to the positive side of the input voltage $V_{IN}$, and switch S2 is connected to the negative side of the input voltage $V_{IN}$. Each switch, depending upon its switched state, is able to connect its respective voltage to a first side of the series resonant circuit, termed the "A" side, or to a second side of the series resonant circuit, termed the "B" side. The state of each switch is determined by the switching signals $\phi_A$ and $\phi_B$. When the signal $\phi_A$ is at a high level, for example, switch S1 connects the positive input voltage terminal $+V_{IN}$ to the "A" side of the series resonant circuit. When the signal $\phi_A$ is at a low level, switch S1 connects the positive input voltage terminal $+V_{IN}$ to the "B" side of the series resonant circuit. Similarly, when the signal $\phi_B$ is at a high level, switch S2 connects the negative input voltage terminal $-V_{IN}$ to the "B" side of the series resonant circuit. Likewise, when the signal $\phi_B$ is at a low level, switch S2 connects the negative input voltage terminal $-V_{IN}$ to the "A" side of the series resonant circuit. The signals $\phi_A$ and $\phi_B$ are controlled by the invertor control circuit 36 so that $+V_{IN}$ is never connected directly to $-V_{IN}$. Rather, when switch S1 is in the "A" state, switch S2 is always in the "B" state; and when switch S1 is in the "B" state, switch S2 is the "A" state. In this manner, the input voltage $V_{IN}$ is applied across the series resonant circuit with a desired polarity as controlled by the switching signals $\phi_A$ and $\phi_B$.

Those having skill in the art can readily fashion appropriate solid state circuits to perform the function of switches S1 and S2. Typically an "H" configuration, or equivalent, is employed where the series resonant circuit (the primary winding of the transformer) represents the horizontal branch of the "H". Respective switches, each of which may be realized, e.g., from a MOSFET (or IGBT), or a plurality of such MOSFETs (or IGBTs) in parallel, is placed in each leg of the "H". The switches in the upper legs of the "H" are connected to the positive input voltage terminal, $+V_{IN}$. The switches in the lower legs are connected to the negative input voltage terminal, $-V_{IN}$. When a voltage of a first polarity is to be applied across the resonant circuit, a first pair of switches in opposing corners of the "H" are turned on, e.g., the switch in the upper left-hand side of the "H" and the switch in the lower right-hand side of the "H". When a voltage of the opposite polarity is to be applied across the resonant circuit, the first pair of switches are turned off, and a second pair of switches in opposing corners of the "H" are turned on, e.g., the switch in the upper right-hand side of the "H" and the switch in the lower left-hand side of the "H". The first pair of switches is never on at the same time that the second pair of switches is on. Both pairs of switches, however, may be off at the same time, e.g., when no voltage is applied across the resonant circuit.

Figure 2B:
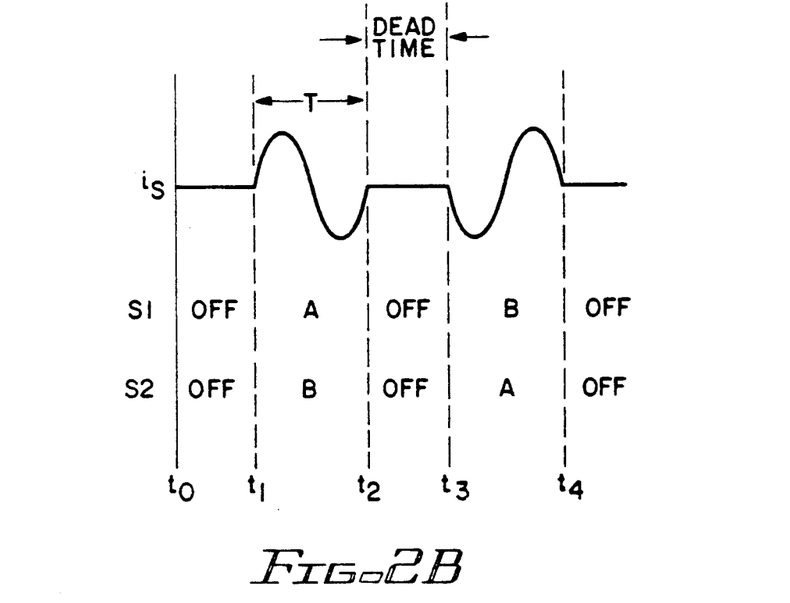
FIG. 2B is a waveform diagram illustrating the typical manner in which the invertor of the SRMPS alternately applies voltages of opposite polarity to a series resonant LC circuit in order to cause sinusoidal quantums (or "packets") of current to flow through the primary of the power transformer.

The operation of the invertor circuit 30 is further illustrated by the waveform diagram of FIG. 2B. FIG. 2B shows the series resonant current $i_s$ that flows through the series resonant circuit as a function of the state of the switches S1 and S2 (and hence as a function of the voltage applied across the resonant circuit). During a first time period, between times $t_0$ and $t_1$, both switches S1 and S2 are off, and no current $i_s$ flows through the resonant circuit (and hence through the primary winding). At time $t_1$, switch S1 is switched to the "A" position, and switch S2 is switched to the "B" position, thereby applying a positive voltage $+V_{IN}$ across the resonant circuit. This applied voltage causes the resonant current $i_s$ to flow in the resonant circuit. The current that flows in a series resonant circuit is substantially sinusoidal, having a period T and a resonant frequency $f_0$ ($=1/T$). If the switches S1 and S2 where to remain in their respective "A" and "B" positions, this sinusoidal resonant current would eventually dampen out. However, at the conclusion of approximately one period of the sinusoidal resonant current, i.e., at time $t_2$, the switches S1 and S2 are turned off, and (for the situation shown in FIG. 2B) remain off until time $t_3$.

At time $t_3$, switch S1 is switched to the "B" position and switch S2 is switched to the "A" position, thereby applying a negative voltage $-V_{IN}$ across the resonant circuit. This negative applied voltage causes the resonant sinusoidal current $i_s$ to flow in the resonant circuit with an opposite phase to that which flowed when a positive voltage was applied. At the conclusion of substantially a complete cycle of the resonant current, i.e., at time $t_4$, the switches S1 and S2 are both turned off.

An important consideration in the operation of a series resonant mode power supply, in accordance with the teachings of the prior art, is to control the switches S1 and S2 so that they change state only when the current $i_s$ is zero. When this occurs, no power is dissipated in the switches S1 and S2, and the efficiency of the resonant mode power supply remains high. Hence, in order to efficiently operate a series resonant mode power supply, it is necessary to deliver the power to the transformer in "quantums" or "packets", with each "quantum" or "packet" comprising one cycle of the sinusoidal resonant current, $i_s$.

The amount of power delivered to the primary winding, and hence to the load, of a resonant power supply in accordance with the teachings of the prior art is controlled by adjusting the off-time period, or "dead time" between adjacent sine wave "quantums". Thus, in FIG. 2B, the "dead time" is the time between $t_2$ and $t_3$.

Figure 3:
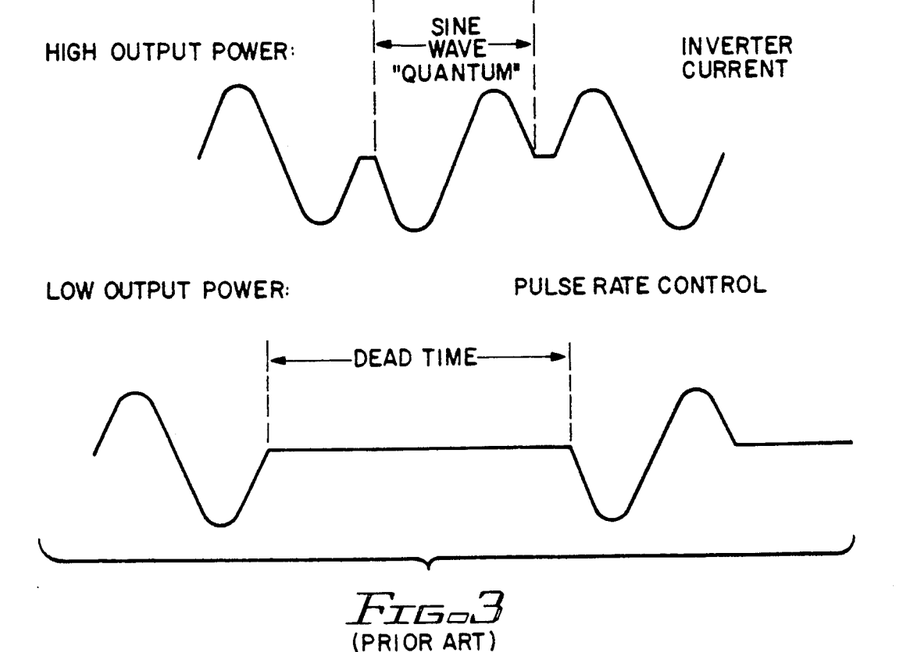
FIG. 3 is a waveform diagram illustrating the pulse rate or frequency modulation technique of the prior art to control the delay, or "dead time", between the sinusoidal quantums of current in order to achieve and maintain a desired output voltage for both high output power and low output power conditions.

Referring to FIG. 3, a waveform diagram is shown illustrating the manner in which the "dead time" is controlled in prior art devices in order to achieve and maintain a desired output voltage under varying output power conditions. As seen in FIG. 3, at high output power (upper waveform), the dead time is reduced to substantially zero, and thus a sine wave "quantum" of one phase immediately follows a preceding sine wave "quantum" of the opposite phase. At low output power conditions, the dead time is significantly increased, with consecutive sine wave "quantums" being delivered only after a significant delay therebetween.

Unfortunately, as described above, there are several problems created when the dead time between sine wave quantums is adjusted, as shown in FIG. 3. Principal among these problems are the "whine" that is created when the operating frequency falls within the audible range. Such whine may be highly undesirable, and can only be minimized by using proper impregnation and shielding techniques. Further, because the power must be delivered in the defined sine wave quantums, each of which contains a fixed energy for the given resonant L/C frequency of the resonant circuit, it is possible that a large ripple voltage will result. For low capacity, low leakage situations, the ripple could approach several percent of the nominal output voltage on the output capacitor. Further, one sine wave quantum may contain sufficient energy to over-voltage the power supply output under a no-load situation.

In order to overcome these problems, the control circuit (invertor control circuit 36 in FIG. 1) of the present invention operates the invertor circuit 30 at a fixed frequency above the audible range, e.g., at a frequency greater than about 20,000 Hz, in one of two modes. A first of these modes is a "full charge" mode, and is used when initially charging the load capacitor $C_L$ of the series resonant power supply. A second of these modes is a "keep alive" mode, and is used when maintaining a desired charge (regulated voltage) on the output capacitor, i.e., for no or low output power. Advantageously, the invertor control circuit automatically switches between these two modes, as required, in order to most efficiently charge the load capacitor and maintain tight regulation thereon once charged.

Figure 4:
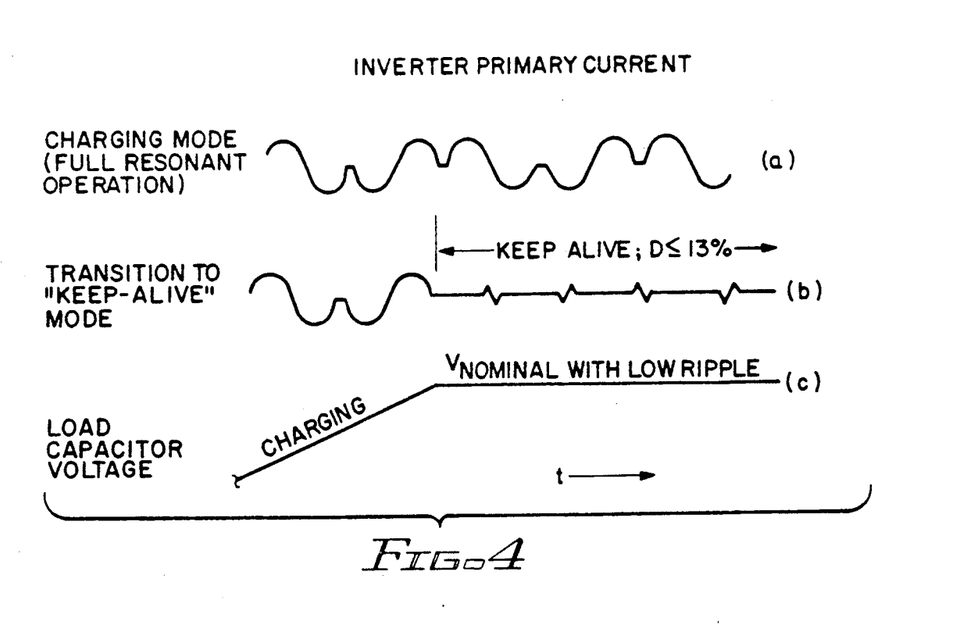
FIG. 4 is a waveform diagram depicting the manner used by the present invention to achieve and maintain a desired output voltage on a load capacitor for both high output power and low output power conditions without changing the switching frequency.

The effect of these two modes of operation on the primary current (i.e., the current flowing through the primary winding of the power transformer) is depicted in FIG. 4. In FIG. 4, waveform diagrams are shown depicting the manner used by the present invention to achieve and maintain a desired output voltage for both high output power and low output power conditions without changing the frequency of the sine wave quantums. During the full charge mode, shown in the top waveform (a) of FIG. 4, the sine wave quantums are delivered to the transformer primary at the maximum rate. This is equivalent to the high output power condition shown in FIG. 3, and represents full resonant mode operation. That is, in the full charge mode the switches S1 and S2, or equivalent, switch the polarity of the voltage applied across the series resonant circuit substantially at the resonant frequency $f_0$. This results in a dead time between sine wave quantums that is substantially zero. Switching of the voltage polarity advantageously occurs only when the current is zero, thereby avoiding high di/dt and dv/dt conditions which cause poor switching efficiency and introduce switching losses. Thus, a high operating efficiency of the power supply is maintained.

In the keep alive mode, shown partially in the middle waveform (b) of FIG. 4, the normal resonant operation is not used. Rather, once the load capacitor has been fully charged using the resonant charge mode, the voltage applied across the series resonant circuit, although still switched in polarity at a rate that is approximately equal to the resonant frequency $f_0$, is only applied for a very short time of the normal resonant period T (see FIG. 2 for a definition of T), resulting in a low duty cycle operation.

Preferably, in the keep alive mode, the overall maximum duty cycle (or conduction angle) of the sine wave current is limited to approximately 13% or less (corresponding to a conduction angle of approximately 45° or less). By limiting the duty cycle (or conduction angle) to these small amounts, the switching loss in the power devices (the switches used in the invertor circuit 30) is negligible. Further, the dv/dt and di/dt transients produced by inductive switching at a conduction angel of 45° or less creates no second order effects in the series resonant circuit that could be detrimental to the power switch elements (e.g., MOSFETs). In contrast, inductive switching that occurs at conduction angles greater than 45° could eventually produce undesirable effects in the power switches.

Thus, in operation, as seen in FIG. 4, initially there is a transition to the keep alive mode as the load capacitor is charged to its full value. Such charging is best seen in the bottom waveform (c) of FIG. 4. As the load capacitor is charging, the power supply is operating in the full charge mode. That is, full cycles of sine wave quantums are delivered to the primary transformer. As soon as the load capacitor is fully charged, the keep alive mode is invoked. In this mode, only a small portion, or "sliver", of the front end of the normal sine wave quantum is allowed to flow through the primary transformer. This "sliver" of current contains sufficient energy to maintain the load capacitor fully charged at low ripple. Moreover, the frequency at which the "sliver" of current is switched for delivery to the transformer primary winding remains the same as the switching frequency used in the full charge mode. Further, the size of the "sliver" of current is kept sufficiently small (having a conduction angle that is no greater than 45°) so that di/dt and dv/dt do not cause problems for the switching devices in the invertor, and the losses in the switching devices remain negligible.

Figure 5:
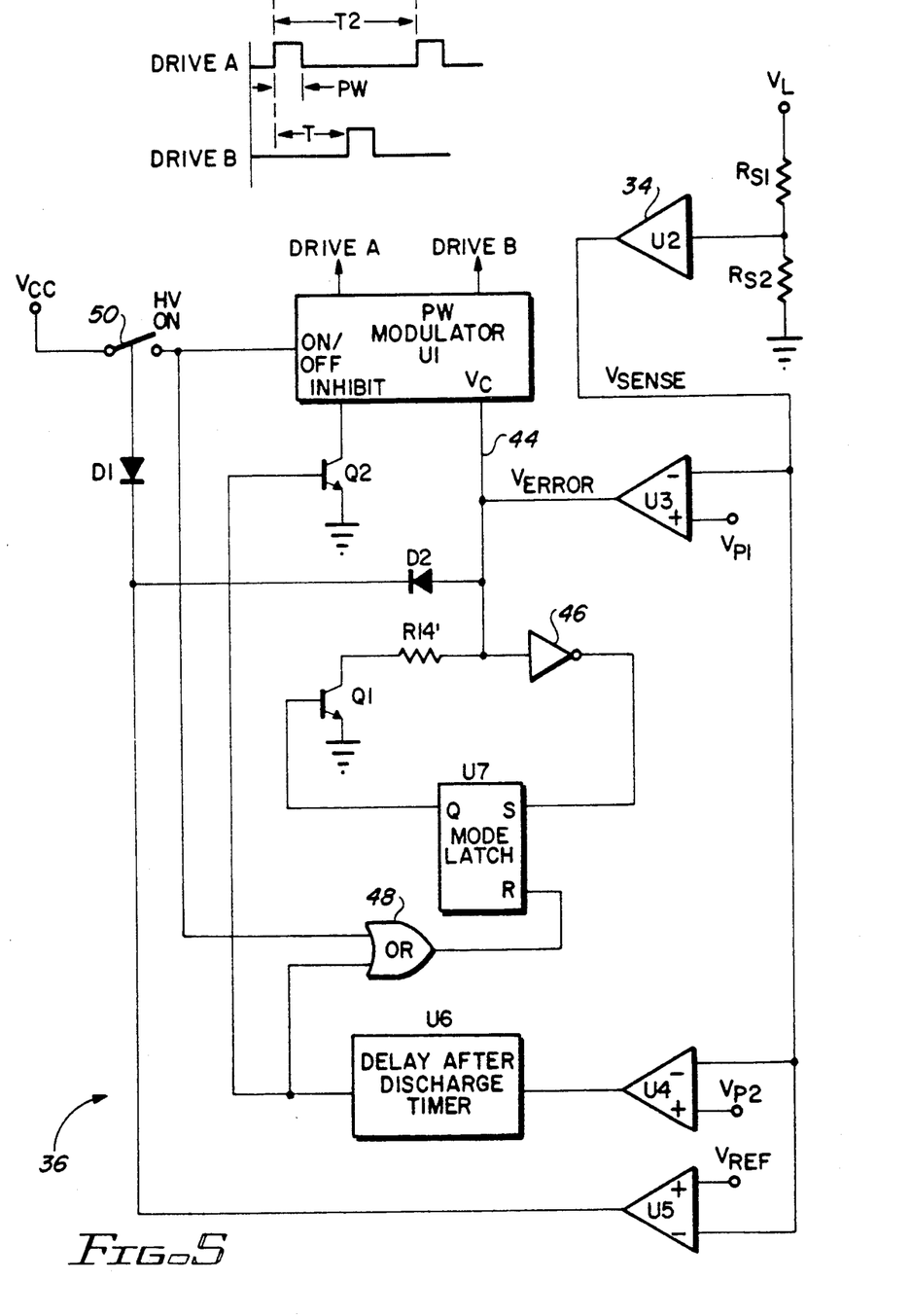
FIG. 5 is a block diagram of the invertor control circuit of the SRMPS of FIG. 1.

Referring next to FIG. 5, there is shown a block diagram of the invertor control circuit 36 of the SRMPS of FIG. 1. The invertor control circuit 36 converts an otherwise conventional SRMPS to the bi-mode SRMPS of the present invention. At the heart of the control circuit 36 is a pulse width (PW) modulator U1. Such PW Modulator U1 may be realized using a commercially available PW modulator integrated circuit, such as the SG-3527A Regulating Pulse Width Modulator available from Silicon General. It is the function of the PW modulator U1 to generate two complementary gate drive signals, identified in FIG. 5 as Drive A and Drive B. The Drive A gate signal and Drive B gate signal are shifted in phase, as shown in the waveform diagram appearing just above U1 in FIG. 5. That is, the Drive A signal, which is a pulse having a pulse width PW, occurs at the beginning of a cycle having a period T2.. The Drive B signal, which is also a pulse having a pulse width PW, occurs beginning at the middle of the period T2. In terms of phase angles, with the period T2 comprising 360°, the Drive A pulse thus begins at 0° and the Drive B pulse begins at 180°. The Drive A pulse width never overlaps the beginning point of the Drive B pulse width. Thus, only one of the Drive A or Drive B pulses is ever present at the same time.

The Drive A and Drive B signals are used to control the switches of the invertor circuit 30 in conventional manner. That is, the $\phi_A$ and $\phi_B$ signals used to control the switches S1 and S2 in FIG. 2 may be derived directly from the Drive A and Drive B signals.

The PW modulator U1 may operate in an open loop mode, wherein a maximum duty cycle of the Drive A and Drive B signals results; or a closed loop mode, wherein a controllable duty cycle of the Drive A and Drive B signals results. For purposes of the pulse width modulator, the duty cycle is defined as the ratio of the pulse width PW to the cycle period T2, i.e., PW/T2. At a maximum duty cycle, the pulse width of the Drive A signal is approximately 50% of T2, and the pulse width of the Drive B signal is approximately 50% of T2. However, a 50% duty cycle from the PW modulator U1 provides a drive gate signal. either the Drive A or Drive B signals, 100% of the time. Because either the Drive A or Drive B signals cause a voltage to be applied across the series resonant circuit, and hence cause the resonant sinusoidal current to flow in the transformer. a 50% duty cycle from the PW modulator U1 as defined above translates to a 100% duty cycle of the SRMPS. Stated another way, the operating duty cycle of the SRMPS is PW/T, where T is the period of the sinusoidal current flowing in the primary winding of the transformer 12, with T being equal to T2/2.

The PW modulator U1 is activated by applying a signal voltage to the terminal "ON/OFF". This signal voltage is supplied whenever the switch 50 is closed. The switch 50 is manually closed whenever charging operation of the SRMPS 10 is desired. However, as explained more fully below, the switch 50 may be tripped open whenever an overvoltage condition is sensed.

The voltage at the load, $V_{OUT}$, is divided down to a manageable level by the resistive divider network comprising resistors $R_{01} \ldots R_{0n}$ and/or resistors $R_{s1}$ and $R_{s2}$, and buffered in amplifier U2. (Note that buffer amplifier U2 serves the same function as the sense buffer amplifier 34 shown in FIG. 1.) The output of the buffer amplifier U2 is a voltage, $V_{SENSE}$, representative of the sensed output voltage of the SRMPS. $V_{SENSE}$ is compared to a first reference voltage $V_{P1}$ in comparator circuit U3. $V_{SENSE}$ is connected to an inverting input of U3, and $V_{P1}$ is connected to a non-inverting input of U3. The output of the comparator circuit U3 is thus a voltage that represents the difference or error between the sensed output voltage $V_{SENSE}$ and the first reference voltage $V_{p1}$. This difference or error voltage is termed $V_{ERROR}$ in FIG. 5, and is connected to a control terminal, $V_c$, of the PW Modulator U1 by way of signal line 44. However, the signal line 44 is also connected to a clamp circuit n comprising transistor Q1 and resistor R14'. When $V_{SENSE}$ is less than $V_{P1}$, the output signal of comparator circuit U3 is high. When $V_{SENSE}$ is greater than $V_{P1}$, indicative that the desired output charge voltage has been reached, the output signal of comparator circuit U3 goes low. This causes the output of invertor gate 46 to go high. The output of invertor gate 46 is connected to the set terminal of a mode latch U7. The Q output of latch U7, when high (as occurs when the latch U7 is set) causes transistor Q1 to turn on. When transistor Q1 is on, then the degree to which the signal line 44 may go low is determined by the amount of current flowing through resistor R14'.

The signal applied to the terminal $V_c$ of the PW modulator U1 determines whether the PW modulator operates in a closed loop mode (controlled duty cycle) or an open loop mode (maximum duty cycle). Thus, the error signal $V_{ERROR}$ determines whether the PW modulator operates in the open loop mode or closed loop mode.

When the SRMPS is first turned on, as when the switch 50 is closed, a high voltage ($V_{CC}$) is presented to one of the two inputs of an OR gate 48. The output of the OR gate 48 is connected to the reset terminal of the mode latch U7. Thus, initial closing of the switch 50 resets the mode latch U7. This action, in turn, turns Q1 off, thereby allowing signal line 44 to float to a high level (not be clamped). As the power supply first starts, the output voltage, as measured by $V_{SENSE}$, is less than the reference voltage $V_{P1}$. Thus, the error voltage $V_{ERROR}$ goes high, causing the PW Modulator U1 to operate in an open loop mode. During this open loop mode, the gate drive signals Drive A and Drive B are generated at maximum duty cycle, causing the invertor 30 to operate in a full resonant mode while the load capacitor $C_L$ of the SRMPS is being charged.

As soon as the buffered sense voltage $V_{SENSE}$ matches the programmed reference voltage $V_{P1}$, the error voltage $V_{ERROR}$ switches low. This causes the PW Modulator U1 to operate in a closed loop mode. Initially, when the control voltage $V_{ERROR}$ is first switched low, the gate drive pulses Drive A and Drive B are reduced to a zero duty cycle (zero pulse width). At the same time, the low error voltage is coupled through invertor gate 46 to set the mode latch U7, thereby turning on transistor Q1. With Q1 on, the error comparator output can vary between zero and up to a certain desired limiting point, after which the error comparator output is clamped by Q1 to a preset level. This preset level is determined by the value of resistor R14'. This preset level limits the duty cycle of the gate drive signals to a desired maximum amount. As indicated above, in the preferred embodiment, this duty cycle is limited to less than about 13%, limiting the conduction angle of the resonant sinusoidal current delivered to the primary winding of the power transformer to no more than about 45°. Changing the value of the resistor R14' allows the value of the maximum duty cycle to be set to a desired level.

With the PW Modulator U1 operating in a closed loop mode, the SRMPS thus operates as a low duty cycle, non-resonant, pulse width modulated system. During this time, the pulse width of the gate drive signals is adjusted between a duty cycle of zero and about 13%, in order to deliver the "slivers" of current to the power transformer used to maintain, or "keep alive", the desired charge on the load capacitor of the SRMPS. Advantageously, this dual mode control scheme provides superior regulation in the keep alive mode over other fully resonant methods which use frequency modulation in the closed loop mode.

As also seen in FIG. 5, the buffered sense voltage $V_{SENSE}$ is further connected to the inverting input of a second comparator circuit U4 and to the inverting input of a third comparator circuit U5. A second reference voltage $V_{P2}$ is connected to the non-inverting input of the second comparator circuit U4. A third reference voltage $V_{Ref}$ is connected to the non-inverting input of the third comparator circuit U5. For some applications, the reference voltage $V_{P1}$ may be the same as the reference voltage $V_{P2}$.

The output of the second comparator U4 is connected to a timer circuit U6, called the "Delay After Discharge Timer". The output of the timer circuit is connected to the other input of the OR gate 48, as well as to the base of a transistor Q2. The collector of Q2 is coupled to an inhibit terminal of the PW Modulator U1. Thus, when Q2 is turned on, during the time period set by the timer circuit U6, the PW Modulator U1 is inhibited.

Should the load capacitor of the SRMPS be discharged, the sensed output voltage $V_{SENSE}$ goes low, and triggers the timer circuit U6, which action inhibits the PW Modulator U1 for a selected time period. In a preferred embodiment, this time period is set by the timer circuit U6 to be a few microseconds, e.g., 50–100 microseconds. At the same time, the mode latch U7 is reset (via the OR gate 48), and the SRMPS is ready for a resonant mode charging cycle again, i.e., operation in the full charge mode.

The third comparator circuit U5 is used as an overvoltage protection (OVP) circuit. This comparator circuit includes a latching circuit (not shown in FIG. 5), and is used to prevent damage to the SRMPS components (or other systems coupled to the SRMPS) in the event of an open circuit output connection. The OVP circuit will trip when the output voltage exceeds approximately 130% of its maximum rated output level. When this occurs, it latches the power supply off via diodes D1 and D2, which force the switch 50 to an open position. The OVP circuit, once tripped, must be reset manually.

Figure 6A:
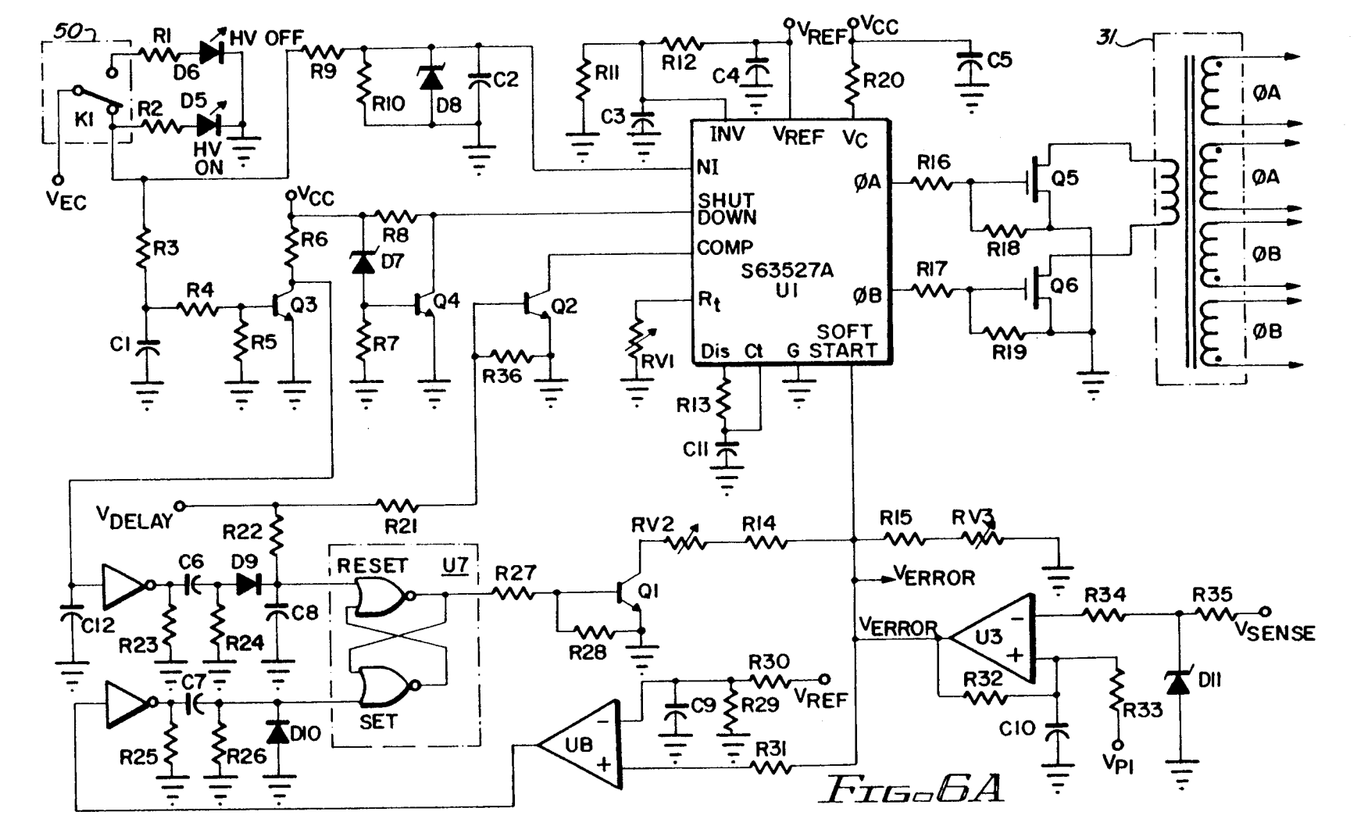
FIGS. 6A and 6B are schematic diagrams of the invertor control, drive transformer, and sense buffer circuits of the SRMPS of FIG. 1 in accordance with one embodiment of the present invention.
Figure 6B:
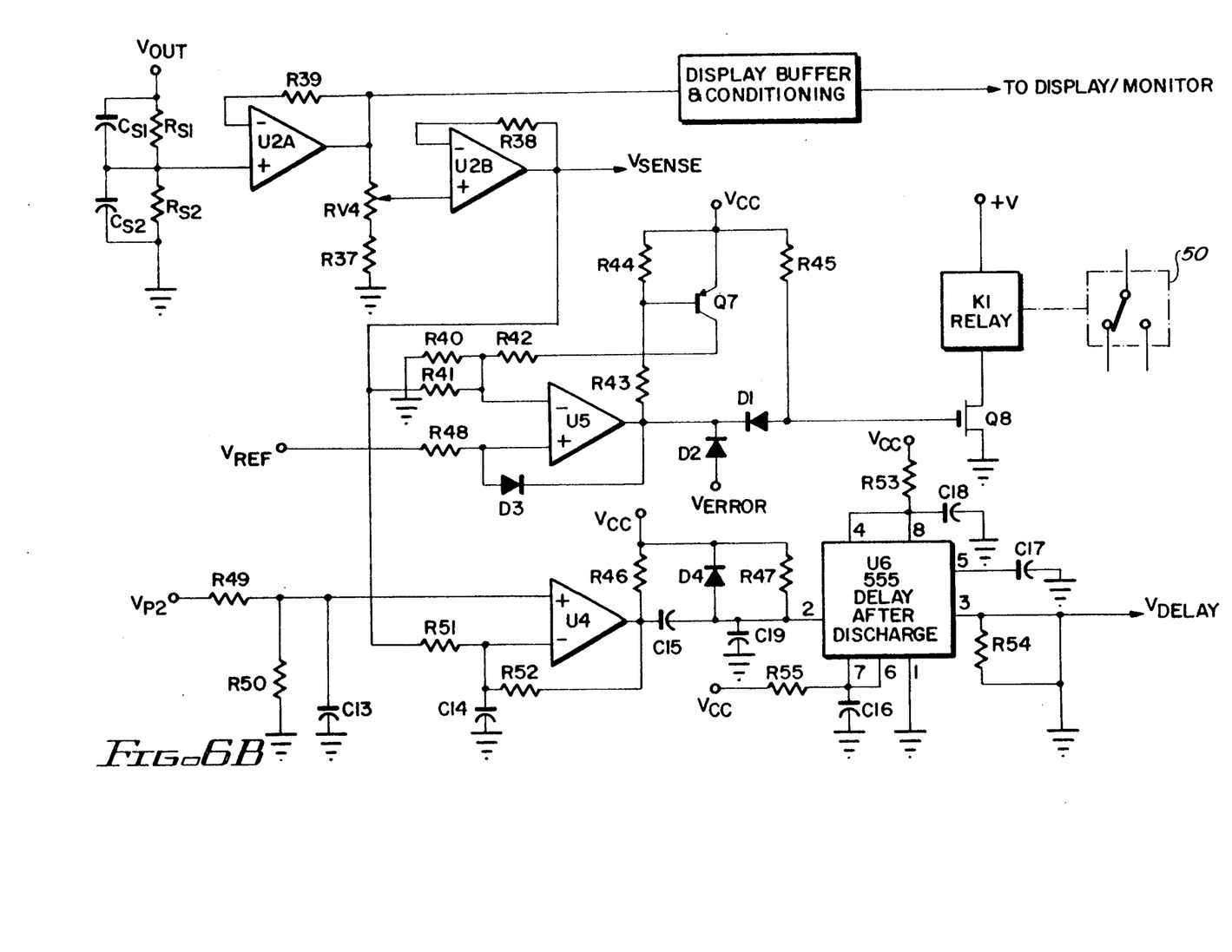

FIGS. 6A and 6B are schematic diagrams of the invertor control circuit 36, the drive transformer 37, and the sense buffer amplifier 34 of the SRMPS of FIG. 1 in accordance with the best mode of the present invention. These schematic diagrams will not be explained in detail, as those skilled in the art can readily correlate that which is shown in these figures with that which has been described above in FIGS. 1 and 5. To facilitate this correlation, the same reference designations are used in FIGS. 6A and 6B as are used in FIGS. 1 and 5 for like parts, as are the same signal labels. Note, in FIG. 6B, that the transistor Q7, and associated components, function to latch the OVP amplifier U5 when tripped by the voltage $V_{SENSE}$ being greater than the reference voltage $V_{Ref}$. That is, when the OVP amplifier is not tripped, i.e., when $V_{SENSE}$ is less than $V_{Ref}$, then the output of the OVP amplifier U5 is high. The base of transistor Q7, which is a PNP transistor, is coupled to the output of U5. Thus, when the output of U5 is high, Q7 remains off. As soon as U5 is tripped, as occurs the instant $V_{SENSE}$ becomes greater than $V_{Ref}$, Q7 turns on. The collector of Q7 is coupled to the inverting input of U5, thus assuring that the inverting input of U5 remains higher than the reference voltage $V_{Ref}$, and keeping the output of U5 low.

The output of U5 is also coupled to diodes D1 and D2. Diode D1 is coupled to the gate of MOSFET Q8. The source terminal of Q8 is coupled to a relay K1. Thus, when U5 is triggered, the transistor Q8 is acted upon so as to control relay K1. Relay K1, in turn, controls switch 50.

As described above, it is thus seen that the present invention provides an SRMPS that efficiently converts nominally available input power, e.g., three-phase 208 VAC, to a high DC output voltage, e.g., 25 kV at 160 ma constant charging current (4000 watts). Such SRMPS is ideally suited for use with a capacitive load.

As further described above, it is seen that the present invention includes an SRMPS control circuit that operates the SRMPS at a fixed frequency above the audible range in such a way that a load capacitor is initially charged in an efficient manner, and once charged, tight regulation at low ripple is maintained.

As also seen from the above, a bi-mode SRMPS power supply is provided that operates in one of two modes, a first "full charge" 100% duty-cycle mode for initially charging a load capacitor of the SRMPS, and a second "keep alive" mode for delivering low currents to the load capacitor. During the keep alive mode, the invertor current used to maintain a charge on the output capacitor is advantageously switched at a duty cycle that is less than or equal to 13%. Advantageously, the invertor of the SRMPS always operates at the same frequency regardless of whether it is operating in the "keep alive" mode or the "full charge" mode.

As further seen from the above description, the present invention advantageously provides an efficient method of operating an SRMPS at a fixed frequency above the audible range.

While the invention herein disclosed has been described by means of specific embodiments and applications thereof, numerous modifications and variations could be made thereto by those skilled in the art without departing from the scope of the invention set forth in the claims.

What is claimed is:

1. A bi-mode power supply for charging a capacitive load comprising:
   series resonant mode power supply means for providing an output voltage comprising:
   an inverter circuit coupled to an input power source,
   a power transformer having a primary winding and at least one secondary winding, said primary winding being connected to be driven by said invertor circuit, and
   a resonant character in series with the primary winding of said power transformer, said resonant capacitor and said primary winding comprising part of a series resonant circuit;
   control means for controlling said series resonant mode power supply means to operate in one of two modes, a first mode being operative whenever the output voltage is less than a prescribed threshold level, and a second mode being operative whenever the output voltage is greater than said prescribed threshold level; and
   sensing means coupled to said series resonant mode power supply means and said control means for sensing said output voltage;
   said first mode comprising a resonant mode wherein said series resonant mode power supply operates at a fixed resonant frequency at substantially a 100% duty cycle;

said second mode comprising a keep-alive mode wherein said series resonant mode power supply operates at a low duty cycle in a non-resonant, pulse width modulated mode;

said inverter circuit being controlled by said control means when operating in said first mode to alternately switch positive and negative voltage potentials across said series resonant circuit at a switching rate that triggers an approximately sinusoidal resonant current flow within said series resonant circuit, said sinusoidal resonant current having an alternating phase commensurate with the polarity of the voltage potential switched across the series resonant circuit, the switching of said voltage potentials being controlled to occur when the sinusoidal resonant current is substantially zero; and said invertor circuit being controlled by said control means when operating in said second mode to momentarily switch alternating positive and negative voltage potentials across said series resonant circuit at said switching rate, said alternating voltage potentials being applied across said series resonant circuit for only a controlled time portion of the period of said first switching rate, whereby only a first portion of the sinusoidal resonant current is allowed to flow within said series resonant circuit.

2. The bi-mode power supply as set forth in claim 1 wherein the ratio of said controlled time portion to said first switching rate period is less than 0.20.

3. The bi-mode power supply as set forth in claim 2 wherein the ratio of said controlled time portion to said first switching rate period is less than 0.14.

4. The bi-mode power supply as set forth in claim 1 wherein said control means includes:

a pulse width modulator circuit that generates complementary drive signals at said switching rate, said drive signals having a substantially fixed pulse width when said pulse width modulator circuit is operating in an open loop mode, and a controlled pulse width when said pulse width modulator circuit is operating in a closed loop mode; and latch means for setting a first control signal in response to said sensed output voltage being greater than said prescribed threshold level, said first control signal being coupled to said pulse width modulator circuit and causing said pulse width modulator circuit to operate in said closed loop mode.

5. The bi-mode power supply as set forth in claim 4 wherein the difference between said sensed output voltage and said prescribed threshold level controls the pulse width of said complementary drive signals generated by said pulse width modulator circuit when operating in said closed loop mode.

6. A bi-mode high voltage resonant power supply comprising:

a power transformer having a primary winding and a plurality of secondary windings;

rectifier means coupled to each of said secondary windings for rectifying and combining the voltages present at each secondary winding and presenting the combined voltage to a capacitive load;

a resonant circuit connected with the primary winding of said power transformer;

an invertor circuit that alternately switches positive and negative voltages across said resonant circuit so as to cause a resonant sinusoidal current to momentarily flow through the primary winding of said power transformer, said resonant sinusoidal current having a phase associated therewith commensurate with the polarity of the switched voltage;

a control circuit that generates switching signals at a fixed switching frequency greater than approximately 20,000 Hz, said fixed switching frequency being related to the resonant frequency of said resonant sinusoidal current, said switching signals being coupled to said invertor circuit to control the switched voltage, said control circuit including sensing means for sensing an output voltage across said capacitive load of said bi-mode resonant power supply, comparison means for determining when the sensed output voltage exceeds a first preselected voltage, and modulator means for generating said switching signals, said modulator means operating in an open loop mode whenever said sensed output voltage is less than said first preselected voltage, and in a closed loop mode whenever said sensed output voltage is greater than said first preselected voltage, said open loop mode comprising a mode wherein said switching signals are generated so as to allow substantially a complete cycle of the resonant sinusoidal current to flow through said primary winding before switching the polarity of the applied voltage, whereby current flows through said primary winding at substantially a 100% duty cycle relative to the period of said fixed switching frequency, and said closed loop mode comprising a mode wherein said switching signals are generated so as to allow only a small portion of each cycle of the resonant sinusoidal current to flow through said primary winding before clamping such current off for the remainder of the switching cycle, whereby current flows through said primary winding at a low duty cycle relative to the period of said fixed switching frequency; and input power supply means for providing said positive and negative voltages that are switched across said resonant circuit.

7. The bi-mode high voltage resonant power supply as set forth in claim 6 wherein said modulator means comprises a pulse width modulator adapted to generate said switching signals to have a prescribed width during said open loop mode, and a controlled width during said closed loop mode, the pulse width of said switching signals in said closed loop mode being a function of the difference between said sensed output voltage and said first preselected voltage up to a maximum value, the pulse width of said switching signals when said pulse width modulator means is operating in said open loop mode being substantially equal to the period of said fixed switching frequency.

8. The bi-mode high voltage resonant power supply as set forth in claim 7 wherein the maximum value of the pulse width of the switching signal provides a duty cycle no greater than 13%, said duty cycle being defined as the ratio of the pulse width of the switching signal to the period of said fixed switching frequency.

9. The bi-mode high voltage resonant power supply as set forth in claim 7 wherein the maximum value of the pulse width of the switching signal provides a conduction angle of said resonant sinusoidal current of no greater than about 45°.

10. Control apparatus for use with a series resonant mode power supply comprising:

sensing means for sensing an output voltage generated by said series resonant mode power supply, said sensing means including a buffer amplifier circuit that generates a buffered output voltage having a magnitude proportional to the output voltage generated by said series resonant mode power supply; and control means for operating said series resonant mode power supply in a resonant mode whenever said output voltage is less than a first prescribed threshold level, and for operating said series resonant mode power supply in a keep-alive, non-resonant, pulse width modulated mode whenever said output voltage exceeds said prescribed threshold level, said control means including:

first comparison means for comparing said buffered output voltage to a first reference voltage and for generating a voltage error signal indicating whether said buffered output voltage is less than or greater than said first reference voltage, said voltage error signal further indicating the difference between said buffered output voltage and said first reference voltage whenever said buffered output voltage is greater than said first reference voltage; and pulse width modulator means for generating gate drive signals for use by said series resonant mode power supply, said gate drive signals having a duty cycle controlled by said voltage error signal, said gate drive signals assuming a maximum duty cycle whenever said buffered output voltage is less than said first reference voltage, and said gate drive signals assuming a variable duty cycle whenever said buffered output voltage is greater than said first reference voltage, said variable duty cycle being a function of the difference between said buffered output voltage and said first reference voltage.

11. The control apparatus as set forth in claim 10 wherein said control means is for further shutting down said series resonant mode power supply whenever the sensed output voltage exceeds a second prescribed threshold level.

12. The control apparatus as set forth in claim 10 wherein said maximum duty cycle assumed by said gate drive signals when said buffered output voltage is less than said first reference voltage comprises a duty cycle of substantially 100%, and said variable duty cycle assumed by said gate drive signals when said buffered output voltage is greater than said first reference voltage comprises a duty cycle that ranges from 0% to about 13%.

13. The control apparatus as set forth in claim 10 wherein said control means further includes means for limiting said variable duty cycle to no more than about 13% when said buffered output voltage is greater than said first reference voltage.

14. The control apparatus as set forth in claim 10 wherein said control means further includes delay means for generating a delay signal whenever the buffered output voltage drops below a second reference voltage, as occurs when an output capacitor of said series resonant mode power supply is momentarily discharged, such momentary discharge causing the output voltage of the series resonant mode power supply to momentarily decrease, and means for inhibiting the operation of said pulse width modulator means for the duration of said delay signal, the output voltage of said series resonant mode power supply decreasing while the operation of said pulse width modulator means is inhibited, thereby causing said buffered output voltage to drop below said first reference voltage, thereby causing the pulse width modulator means to generate said gate drive signals at the maximum duty cycle at the conclusion of said delay signal.

15. The control apparatus as set forth in claim 14 wherein said control means further includes;

overvoltage protection means for turning off the operation of said pulse width modulator means whenever said buffered output voltage is greater than a third reference voltage.

16. A method of controlling a resonant mode power supply, said resonant mode power supply including a power transformer having a primary winding that forms part of a resonant circuit, said power transformer further having at least one secondary winding coupled to a rectifier circuit and a load capacitor, whereby a charge is developed on said load capacitor, and hence an output voltage is generated on said load capacitor, whenever an electrical current flows through said primary winding, said method including the steps of:

(a) sequentially applying a DC input voltage of alternating polarities at a fixed switching rate across said resonant circuit so as to cause a resonant sinusoidal current of alternating phase to flow through said primary winding, with said resonant sinusoidal current changing phase only at those times within the cycle of said resonant sinusoidal current when the amplitude of the current is approximately zero;

(b) when the output voltage is less than a prescribed level, applying the DC input voltage of alternating polarities across said resonant circuit at substantially a 100% duty cycle relative to said fixed switching rate, whereby an input voltage of one polarity is applied across said resonant circuit for a sufficient time to allow substantially a complete sinusoidal cycle of said resonant sinusoidal current to flow through said primary winding before applying an input voltage of the opposite polarity across said resonant circuit, whereby the load capacitor is charged at a maximum rate; and (c) when the output voltage is at a prescribed level, applying the DC input voltage of alternating polarities across said resonant circuit at a duty cycle no greater than about 13%, whereby an input voltage of one polarity is applied across said resonant circuit for a short time period, and allows only a small portion of the resonant sinusoidal current to flow through said primary winding during each period of the switching rate, whereby the charge on the load capacitor is maintained.

17. The method of controlling a resonant mode power supply as set forth in claim 16 wherein step (a) comprises sequentially applying said DC input voltage of alternating polarities at a fixed switching rate of greater than about 20 KHz.

* * * * *

UNITED STATES PATENT AND TRADEMARK OFFICE
CERTIFICATE OF CORRECTION

PATENT NO. : 5,121,314

DATED : June 9, 1992

INVENTOR(S) : Cathell, et al

It is certified that error appears in the above-identified patent and that said Letters Patent is hereby corrected as shown below:

On title page, item [56], Under "Other Publications, SG1524B", change "Cicuits" to --Circuits--. Column 4, line 27, change "wining(s)" to --winding(s)--. Column 11, line 67, after "circuit" delete "n". <u>IN THE CLAIMS</u>: Column 7, line 15 and column 14, line 47, change "inverter" to --invertor--. Column 14, line 53, change "character" to --capacitor--.

Signed and Sealed this

Twenty-fourth Day of August, 1993

Attest:

BRUCE LEHMAN

*Attesting Officer*    *Commissioner of Patents and Trademarks*